United States Patent [19]

Hamaguchi et al.

[11] Patent Number: 4,992,860
[45] Date of Patent: Feb. 12, 1991

[54] COLOR SCANNING SYSTEM

[75] Inventors: Tadahiko Hamaguchi; Masatoshi Katoh; Tsuneo Sato, all of Kamakura, Japan

[73] Assignee: Mitsubishi Denki Kabushiki Kaisha, Japan

[21] Appl. No.: 329,280

[22] Filed: Mar. 27, 1989

[30] Foreign Application Priority Data

| Mar. 29, 1988 | [JP] | Japan | 63-75043 |
| Mar. 31, 1988 | [JP] | Japan | 63-131382 |
| Mar. 31, 1988 | [JP] | Japan | 63-131383 |
| Mar. 31, 1988 | [JP] | Japan | 63-131384 |

[51] Int. Cl.$^5$ .............................................. H04N 1/46
[52] U.S. Cl. ........................................ 358/75; 358/428; 358/431
[58] Field of Search ............ 358/80, 75, 81, 482, 358/483, 163, 213.11, 213.15, 213.23, 213.29, 428, 431; 382/67, 58, 65, 55, 54, 44

[56] References Cited

U.S. PATENT DOCUMENTS

| 4,543,489 | 9/1985 | Harada et al. | 358/213.11 |
| 4,641,183 | 2/1987 | Kinoshita | 358/213.29 |
| 4,663,656 | 5/1987 | Elabd et al. | 358/75 |
| 4,698,515 | 10/1987 | Sepai | 358/482 |
| 4,776,031 | 10/1988 | Mita | 358/483 |
| 4,829,368 | 5/1989 | Kobayashi et al. | 358/213.29 |

FOREIGN PATENT DOCUMENTS 0148280  8/1985  Japan .................................. 358/75

OTHER PUBLICATIONS

L. Yuzuki, et al., "A 5732-Element Linear CCD Image Sensor," IEEE Trans. Electron Device, vol. ED-32, pp. 1541-1545.
K. A. Parulski, "Color Filter and Processing Alternatives for One-Chip Cameras," IEEE Trans. Electron Devices, vol. ED-32, pp. 1381-1389.
M. G. Cottet, "Solid-State Image Sensors," Sensors and Actuators, vol. 10, pp. 287-302, 1986.

*Primary Examiner*—Edward L. Coles, Sr.
*Assistant Examiner*—Jerome Grant
*Attorney, Agent, or Firm*—Leydig, Voit & Mayer

[57] ABSTRACT

In a color scanning system for producing color signals for an original scanned by an array of picture elements made up of multiple detectors with color filters, color distortion at boundaries between regions of different colors is reduced by means of signal processing. Differences in a brightness signal between adjacent picture elements are used to determine whether signals attributed to a detector of a given picture element will be signals detected on that detector or on a respective detector of an adjacent picture element, or a signal interpolated between signals from that detector and respective detectors of adjacent picture elements or between the respective detectors and a reference point. In a another embodiment, detectors in a row on picture elements are arranged in first and second rows. Each of the first and second rows has a charge coupled device (CCD) for storing color signals produced by the detectors in each row and for shifting the stored signals out. An intermediate storage device is interposed between the first row of detectors and the CCD. The intermediate device stores signals from the first row until the CCD of the second row samples signals. Thus, data in the CCDs of both rows are shifted out simultaneously.

3 Claims, 15 Drawing Sheets

| S | M₁ | M₂ | Y' | C' |
|---|---|---|---|---|
| + | GREAT | GREAT | $\frac{Y_n + Y_{(n-1)}}{2}$ | $\frac{C_n + C_{(n-1)}}{2}$ |
| + | GREAT | SMALL | $Y_n$ | $C_n$ |
| + | SMALL | GREAT | $Y_{(n-1)}$ | $C_{(n-1)}$ |
| + | SMALL | SMALL | $Y_n$ | $C_n$ |
| − | GREAT | GREAT | $Y_n$ | $C_n$ |
| − | GREAT | SMALL | $Y_n$ | $C_n$ |
| − | SMALL | GREAT | $Y_{(n-1)}$ | $C_{(n-1)}$ |
| − | SMALL | SMALL | $Y_n$ | $C_n$ |

FIG. 15

| | | | ↓tn | | |
|---|---|---|---|---|---|
| W1 | $W_{n-1}$ | $W_n$ | $W_{n+1}$ | $W_{n+2}$ | $W_{n+3}$ |
| W2 | $W_{n-2}$ | $W_{n-1}$ | $W_n$ | $W_{n+1}$ | $W_{n+2}$ |
| W3 | $W_{n-3}$ | $W_{n-2}$ | $W_{n-1}$ | $W_n$ | $W_{n+1}$ |
| ID1 | $\|W_{n-2}-W_{n-1}\|$ | $\|W_{n-1}-W_n\|$ | $\|W_n-W_{n+1}\|$ | $\|W_{n+1}-W_{n+2}\|$ | $\|W_{n+2}-W_{n+3}\|$ |
| ID2 | $\|W_{n-2}-W_{n-3}\|$ | $\|W_{n-1}-W_{n-2}\|$ | $\|W_n-W_{n-1}\|$ | $\|W_{n+1}-W_n\|$ | $\|W_{n+2}-W_{n+1}\|$ |
| SEL | $S_{n-2}$ | $S_{n-1}$ | $S_n$ | $S_{n+1}$ | $S_{n+2}$ |
| D1 | $D_{n-1}$ | $D_n$ | $D_{n+1}$ | $D_{n+2}$ | $D_{n+3}$ |
| D2 | $D_{n-2}$ | $D_{n-1}$ | $D_n$ | $D_{n+1}$ | $D_{n+2}$ |
| D3 | $D_{n-3}$ | $D_{n-2}$ | $D_{n-1}$ | $D_n$ | $D_{n+1}$ |

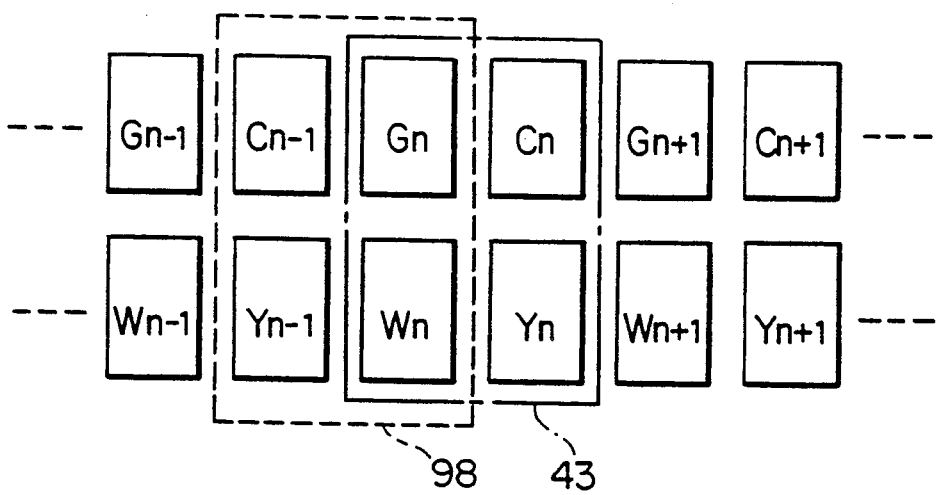
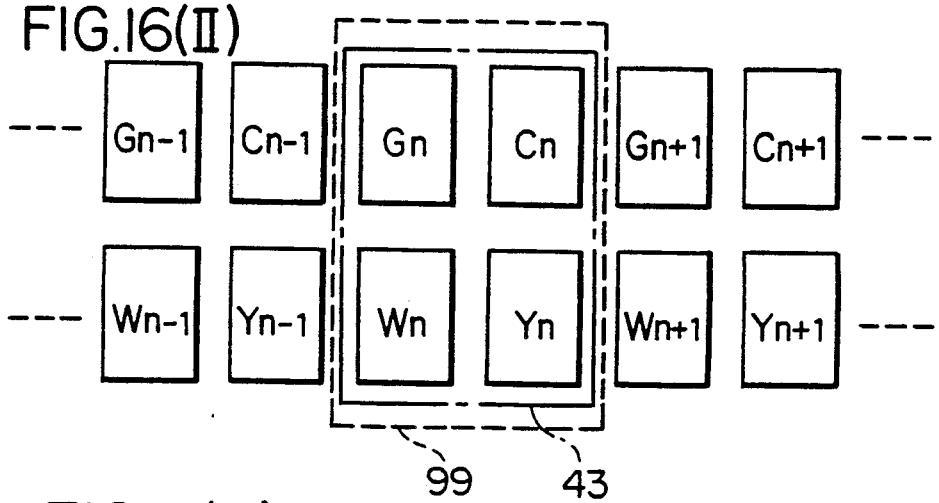
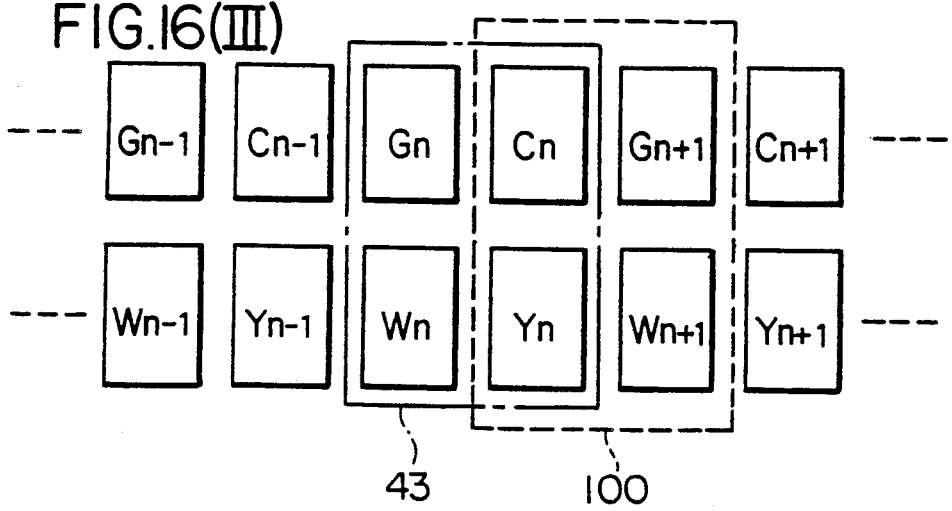

COLOR SCANNING SYSTEM

BACKGROUND OF THE INVENTION:

This invention relates to a color scanning system which converts a color image into electric signals, and more particularly to a color scanning system which can enhance the quality of a read image.

FIG. 1 is a schematic side view showing a conventional color scanner. Referring to the figure, an original 1 is placed on a platen 2. Arranged under the platen 2 is a fluorescent lamp 3 which is illumination means for illuminating the original 1. In addition, a rod lens array 5 which is focusing means for focusing the color image of the original 1 on an image sensor 4 is arranged near the fluorescent lamp 3.

In the conventional color scanner constructed as stated above, the original 1 put on the platen 2 is illuminated by the fluorescent lamp 3, and the color image of the original 1 is focused into an erect real image with the same size as that of this color image on the image sensor 4 by the rod lens array 5. The fluorescent lamp 3, image sensor 4 and rod lens array 5 are unitarily moved relative to the original 1 and platen 2 in the direction of arrow A. Therefore, the image information items of the original 1 are converted into electric signals sequentially every scanning line.

FIGS. 2 and 3 are a plan view of the image sensor 4, and a plan view showing the layout of color filters in the photodetective area of the image sensor 4, respectively. In FIG. 2, the image sensor 4 is configured of an insulator substrate 41, and a plurality of CCD (charge-coupled device) image sensors 42 which are disposed straight on the insulator substrate 41. In FIG. 3, one picture element 43 is composed of detectors 431–434 which are disposed on one CCD image sensor 42. The detector 431 is a detector which has no color filter (W), and the detectors 432, 433 and 434 are detectors whose front surfaces are formed with the color filters of yellow (Y), green (G) and cyan (C), respectively. Light having fallen on the detectors 431–434 is converted into electric signals, which are externally derived by CCD channels (not shown) disposed on both the sides of the detector array.

Now, there will be explained a method by which output values derived as stated above are converted into (R, G, B) values being ordinary color signals. When Anw, Any, Ang and Anc respectively denote the output values of digital signals obtained by the A/D (analog-to-digital) conversion of the output signals from the detectors 431–434 constituting the n-th picture element 43, the (R, G, B) values are given by the following equation (1):

$$\begin{pmatrix} R \\ G \\ B \end{pmatrix} = \begin{pmatrix} M_{11} & M_{12} & M_{13} & M_{14} \\ M_{21} & M_{22} & M_{23} & M_{24} \\ M_{31} & M_{32} & M_{33} & M_{34} \end{pmatrix} \begin{pmatrix} Anw \\ Any \\ Ang \\ Anc \end{pmatrix} \quad (1)$$

The matrix of 3 rows and 4 columns used in Eq. (1) is called a "transformation matrix M", which has the following elements by way of example:

$$M = \begin{pmatrix} 1 & 0 & 0 & -1 \\ 0 & 0 & 1 & 0 \\ 1 & -1 & 0 & 0 \end{pmatrix} \quad (2)$$

Next, operations in the prior-art color filter array will be explained. Assuming by way of example that yellow light whose magnitude is "2" has entered one picture element 43, the output values Anw, Any, Ang and Anc of the respective detectors 431–434 within the picture element 43 become:

$$Anw=2, Any=2, Ang=1, Anc=1$$

By substituting these values into Eqs. (1) and (2), the R, G and B values are obtained as follows:

$$R=1, G=1, B=0$$

and it is found that the color of the light having entered the picture element 43 is yellow.

However, the image of the original 1 detected by the picture element 43 is not limited to a uniform color. A boundary between two different colors could lie in the middle of the picture element 43. How the R, G and B values are on this occasion, will be explained on a case where the boundary of colors lies substantially in the middle of the picture element (at a line L in FIG. 3). Assuming by way of example that white light having a magnitude of "3" has entered the detectors 431 and 433 and that black light having a magnitude of "0" has entered the detectors 432 and 434, the output values Anw, Any, Ang and Anc of the respective detectors 431–434 become:

$$Anw=3, Any=0, Ang=1, Anc=0$$

In accordance with Eqs. (1) and (2), the R, G and B values are calculated as follows:

$$Rn=3, Gn=1, Bn=3$$

These values indicate a color of magenta group, and it is understood that noise develops in which magenta mixes on the boundary line between white and black.

As stated above, the color scanning system in the prior art has had the problem that, in such a case where the boundary part of colors on the original 1 comes to lie in the middle of one picture element 43 in the operation of reading a color image, the photoelectric conversion outputs of the picture element 43 exhibit a color quite different from the colors of the original 1, to incur noise in the contour part of a read image.

For the purpose of reducing the aforementioned noise, it is sometimes practised to make the start times of the storage periods of the CCD image sensor different and to provide buffer memory circuits which compensate the attendant shifts of the output signals. This measure will now be explained with reference to FIG. 4 thru FIG. 9.

In FIG. 4, which is a more detailed layout plan corresponding to FIG. 3, numerals 141 and 142 designate transfer gates through which charges generated by input light in the detectors 431, 432 and the detectors 433, 434 are respectively transferred to CCD channels 151 and 152.

In addition, FIG. 5 is a timing chart showing the conventional operation of the CCD image sensor 42.

The CCD image sensor 42 operates as follows: When the transfer gate 141 is in its "off" state, the light entering the detectors 431, 432 is converted into the charges, which are stored in these detectors. Subsequently, when the transfer gate 141 falls into its "on" state, the stored charges are transferred to the CCD channel 151. Potential wells (not shown) corresponding to the individual detectors 431, 432 exist in the CCD channel 151. By impressing two-phase clock pulses $\phi 1$ and $\phi 2$ on the CCD channel 151, the charges transferred thereto from the detectors are successively shifted to the adjacent potential wells until they are derived as analog signals out of the CCD image sensor 42 by a floating diffusion amplifier (not shown) provided at the final stage of the CCD channel 151. In actuality, as illustrated in the timing chart of FIG. 5, transfer gate pulses $\phi T$ are input at a period of a time TS (FIG. 5, (a)) while the two-phase clock pulses $\phi 1$ and $\phi 2$ (FIG. 5, (b) and (c)) are being continuously impressed. In this case, the charges transferred to the CCD channel 151 by the second transfer gate pulse $\phi T$ are equal to the charges stored in the detectors 431, 432 during the preceding time TS. Accordingly, signals whose magnitudes are proportional to the quantities of the light having entered the detector 431 formed with no color filter and the detector 432 formed with the yellow color filter can be alternately derived as time series signals from the floating diffusion amplifier at the final stage of the CCD channel 151. The operations of the detectors 433, 434, transfer gate 142 and CCD channel 152 on the other side are similar to the operations stated above.

In a prior-art example, the method of preventing the noise at the boundary part of the read image proceeds as stated below:

Symbols $\phi 1$ and $\phi 2$ shown at (a) and (b) in FIG. 6 denote two-phase clock pulses which are normally and continuously impressed on the CCD channels 151 and 152 in FIG. 4. Symbols $\phi T_{GA}$ and $\phi T_{GB}$ shown at (c) and (d) in FIG. 6 denote transfer gate pulses which are impressed on the transfer gates 142 and 141, respectively. The periods TSA and TSB of the respective transfer gate pulses $\phi T_{GA}$ and $\phi T_{GB}$ become storage times. When the lower part of FIG. 4 with respect to a center line L' is defined as channel-A and the upper part as channel-B, it can be said that the storage time of the channel-A is the time TSA, while the storage time of the channel-B is the time TSB. In this prior-art example, the periods TSA and TSB are equal, but the start times of the storage times of the individual channels differ by a time interval TD. As shown at (e) and (f) in FIG. 6, accordingly, output signals $D_A$ and $D_B$ from the channel-A and channel-B are respectively delivered in the order of signals A1g, A1c, A2g, A2c, ... and in the order of signals A1w, A1y, A2w, A2y, ... immediately after the impressions of the transfer gate pulses $\phi T_{GA}$ and $\phi T_{GB}$.

Next, the operation of the color boundary part will be explained. FIG. 7 shows those positions (in a vertical line scan direction) of the original 1 (in FIG. 1) at which the detectors of the channel-A and channel-B in the color scanner exist with the lapse of time. Letter P in FIG. 7 designates a vertical line scan pitch. It is assumed that, at a point of time $t_0$ indicated in FIG. 7, the detectors 433, 434 of the channel-A lie at a position y0, while the detectors 431, 432 of the channel-B lie at a position y0−(P/2). In the color scanner, the individual detectors 431-434 are moved relative to the original 1. A line S1 in FIG. 7 indicates the moved states of the detectors 433, 434 of the channel-A, and a line S2 the moved states of the detectors 431, 432 of the channel-B. When the storage time is started at the point of time $t_0$, light which enters the detectors 433, 434 of the channel-A during the storage time TSA is the reflected light of a part from the position y0 to a position y0+P on the surface of the original 1. The detectors 431, 432 of the B-channel photoelectrically convert the image of a part from the position y0−(P/2) to a position y0+(P/2) on the surface of the original 1. This operation has been the major cause of the generation of the noise at the color boundary part. Therefore, the start time of the storage time TSB of the channel-B is set at $t_0+(TSA/2)$. Thus, the part from the position y0 to the position y0+P on the surface of the original 1 can be photoelectrically converted also for the channel-B as seen from FIG. 7. Accordingly, even when the color boundary part of the original 1 lies between the positions y0 and y0+P, merely the neutral tint of the colors on both the sides of the boundary appears, and no noise can be formed.

The output signals of the individual channels delivered from the CCD image sensor 42 in this way are process as stated below: FIG. 8 is a timing chart showing the storage times TSA, TSB of the respective channels and the timings of the deliveries of the output signals $D_A$, $D_B$.

The respective output signals $D_A$, $D_B$ begin to be successively delivered immediately after the corresponding storage times have ended. In FIG. 8, the delivery intervals of the output signals $D_A$, $D_B$ are indicated by hatched lines. The picture element signals of the picture elements G, C of the output signal $D_A$ and those of the picture elements W, Y of the output signal $D_B$ shift by a time interval $T_D$. In converting the output signals into the (R, G, B) values on the basis of Eq. (1) stated before, therefore, it is necessitated that the output signal $D_A$ is delayed for the time interval $T_D$ into a signal $D_A'$ as illustrated in FIG. 8, whereupon Eq. (1) is calculated using the signals $D_A'$ and $D_B$.

FIG. 9 is a fundamental block diagram of a color conversion circuit which converts the picture element signals G, C, W and Y into the R, G and B values. The output signal $D_A$ delivered from the CCD channel 151 as shown at (d) in FIG. 5 has only its output signal components sampled and held by a sample-and-hold circuit 171 in FIG. 9. Thereafter, the time series signals G and C are separated into individual signals G and C by a demultiplex circuit 181. Numerals 191 and 192 designate the buffer memory circuits which serve to delay the respective individual signals G and C for the time interval $T_D$. Symbols G' and C' in the figure denote image signals delayed for the time interval $T_D$ with respect to the respective signals G and C.

The output signal DB delivered from the CCD channel 152 as shown at (e) in FIG. 5 is similarly separated into individual signals W and Y through a sample-and-hold circuit 172 and a demultiplex circuit 182. The individual signals G', C', W and Y sampled and held by the above processing are input to a matrix calculation circuit 110 for calculating Eq. (1) mentioned before, thereby to be converted into the R, G and B values.

As thus far explained, the prior-art signal processing method is such that the start times of the storage intervals of the respective channels of the CCD image sensor are made different in order to reduce the noise of the color boundary part, and that the attendant shift of the output signals is compensated by the buffer memory circuits disposed externally.

Since the prior-art system is constructed as described above, it requires the buffer memory circuits which realize the different start times of the storage intervals of the CCD image sensor for the purpose of reducing the noise of the color boundary part and which compensate the attendant shift of the output signals. Therefore, the prior art has had the problems that the circuit arrangement is complicated and that the scanner becomes expensive.

SUMMARY OF THE INVENTION

This invention has been made in order to solve the problems stated above, and has for its object to provide a color scanning system in which noise at the color boundary part of a read image can be reduced by a simple construction.

In one aspect of performance of this invention, a color scanning system comprises illumination means for illuminating an original, a plurality of detectors by which a color image formed by illuminating the original is converted into electric signals, focusing means for focusing the color image on said detectors, a plurality of color filters which discriminate colors of the focused color image and which are disposed on some of said detectors, and color signal conversion means; said color signal conversion means including brightness signal extraction means for setting signals from the detector with no color filter, as brightness signals and for deriving the brightness signals corresponding to $(n-1)$-th, n-th and $(n+1)$-th picture elements where n denotes a plus integer, as brightness signals existing at an identical time, detection means for detecting differences between the $(n+1)$-th and n-th derived brightness signals and between the n-th and $(n-1)$-th derived brightness signals, interpolation means for interpolatingly processing color signals detected by detectors of identical color components corresponding to the n-th picture element and the $(n-1)$-th or $(n+1)$-th picture element, so as to find a color signal during the meantime, and selection means for delivering one of the n-th color signal, the $(n-1)$-th or $(n+1)$-th color signal and the interpolated signal produced by said interpolation means, as an n-th color signal output in accordance with the detected difference signals produced by said detection means.

BRIEF DESCRIPTION OF THE DRAWINGS

FIG. 11 is a function table for explaining the operations of selectors included in the color signal conversion circuit in FIG. 10;

FIG. 15 is an explanatory diagram showing the operation of the signal processing portion in FIG. 14;

FIG. 16 is an enlarged plan view showing the combinations of detectors which constitute the n-th picture element;

Throughout the drawings, the same symbols indicate identical or equivalent portions.

DESCRIPTION OF THE PREFERRED EMBODIMENTS

Figure 3:
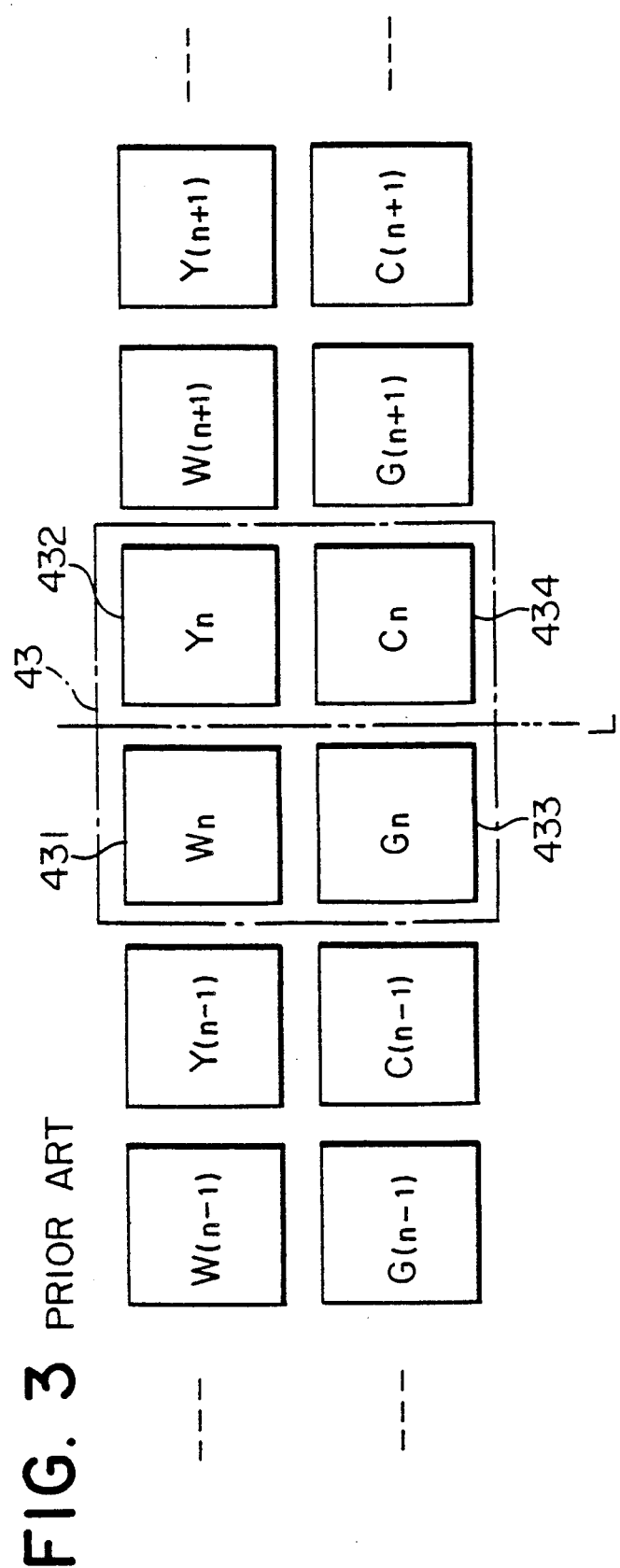
FIG. 3 is an enlarged plan view of the detector area of the image sensor shown in FIG. 2.
Figure 4:
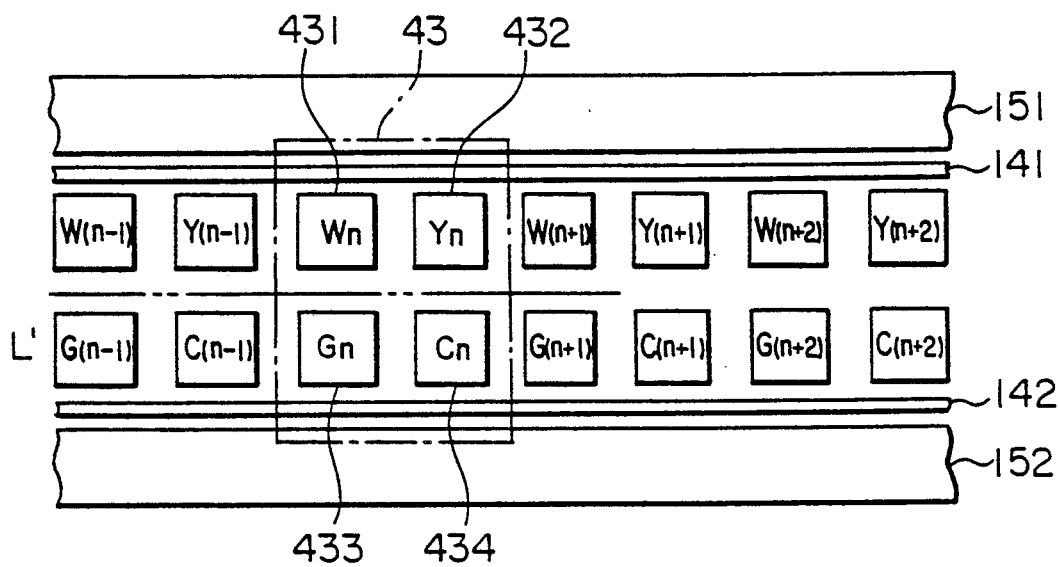
FIG. 4 is an enlarged plan view showing the detector area in FIG. 3 in more detail in order to explain a prior-art example.
Figure 5:
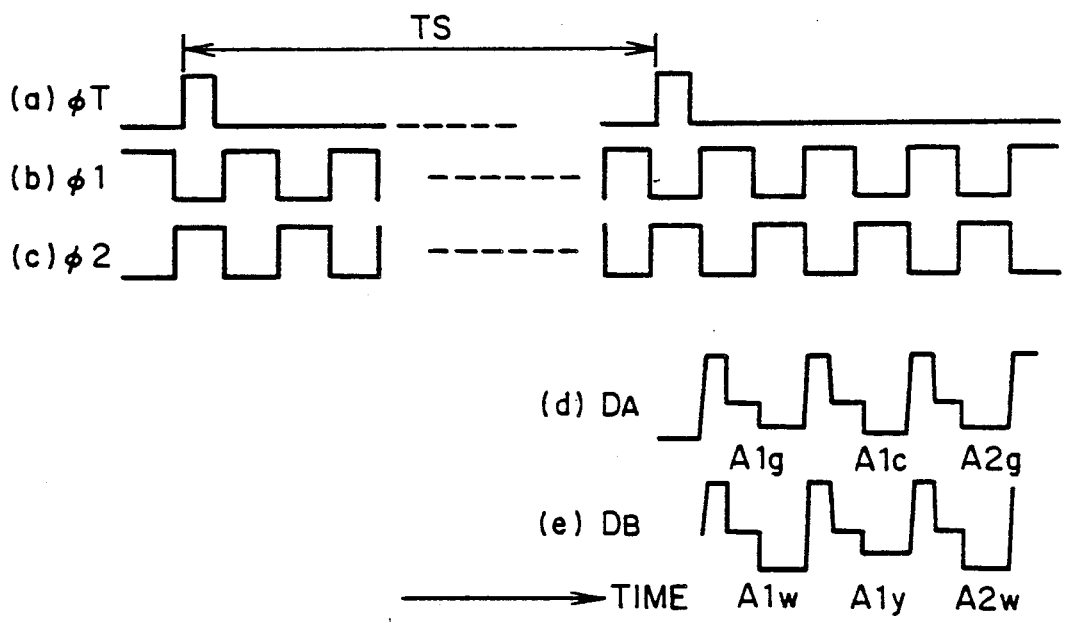
FIG. 5 is a timing chart showing a method of driving the image sensor in FIG. 4.
Figure 6:
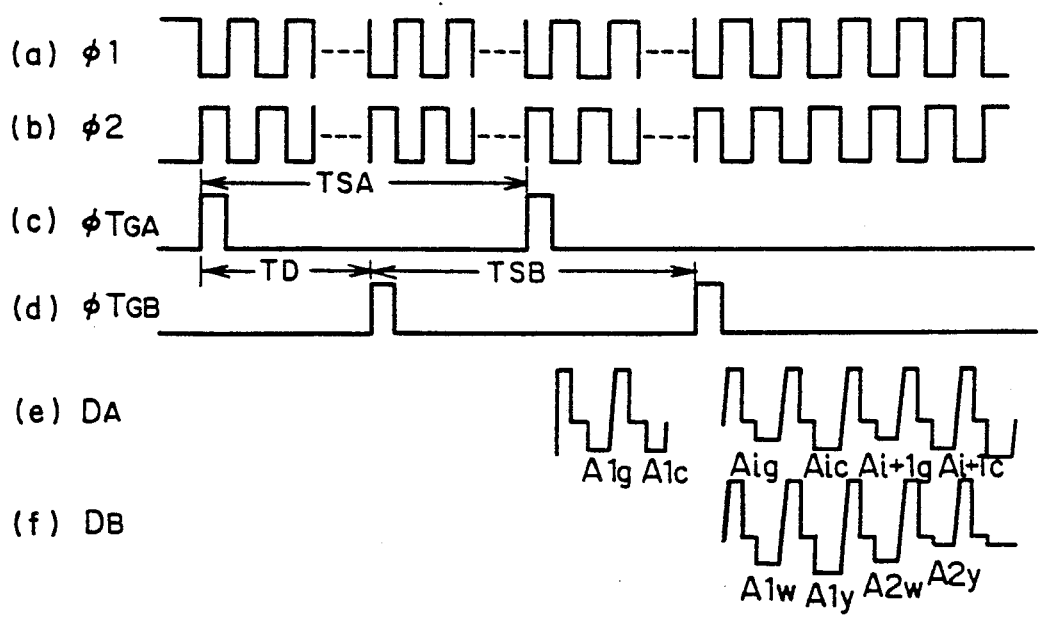
FIG. 6 is a timing chart showing a method of driving the image sensor in a prior-art system.
Figure 7:
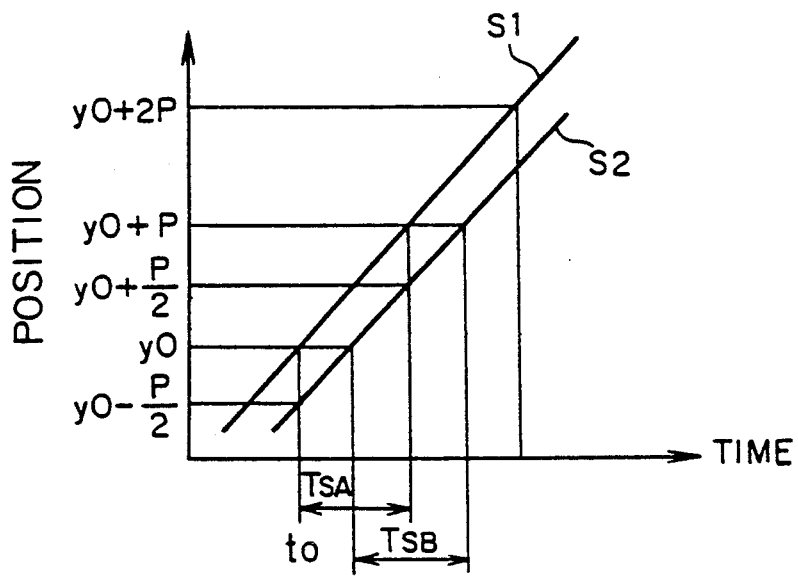
FIG. 7 is an explanatory diagram showing the positional relationships between the image sensor and an original in the prior-art system.
Figure 8:
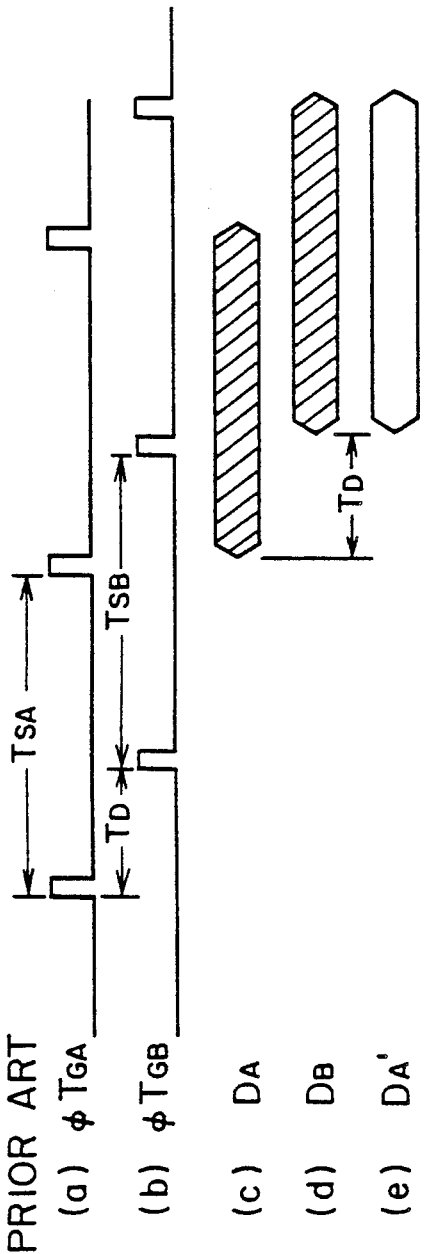
FIG. 8 is an explanatory diagram showing the relationships between the storage intervals and output producing times of the detectors in the prior-art system.
Figure 9:
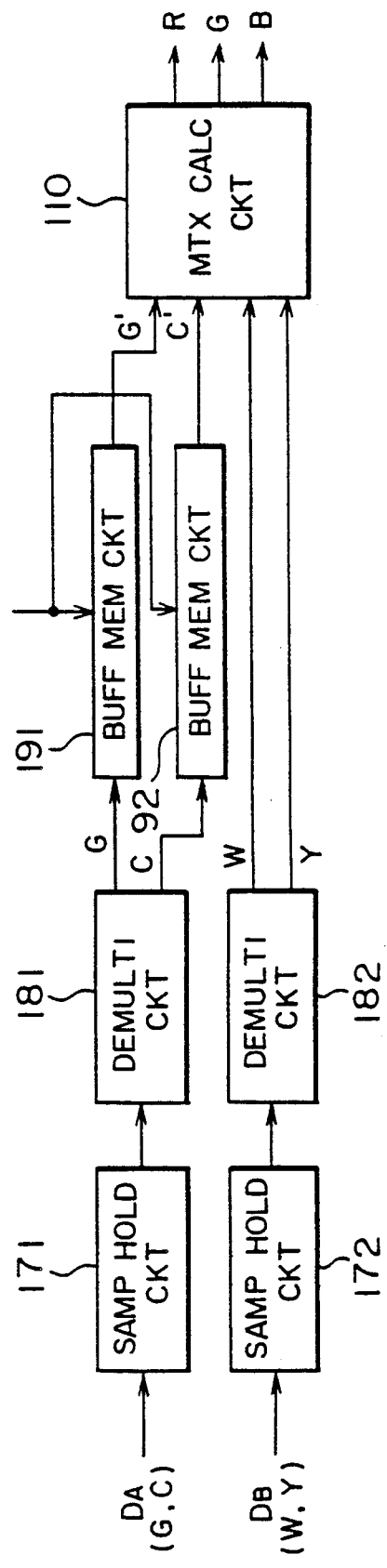
FIG. 9 is a block diagram showing a method of converting colors in the prior-art system.
Figure 10:
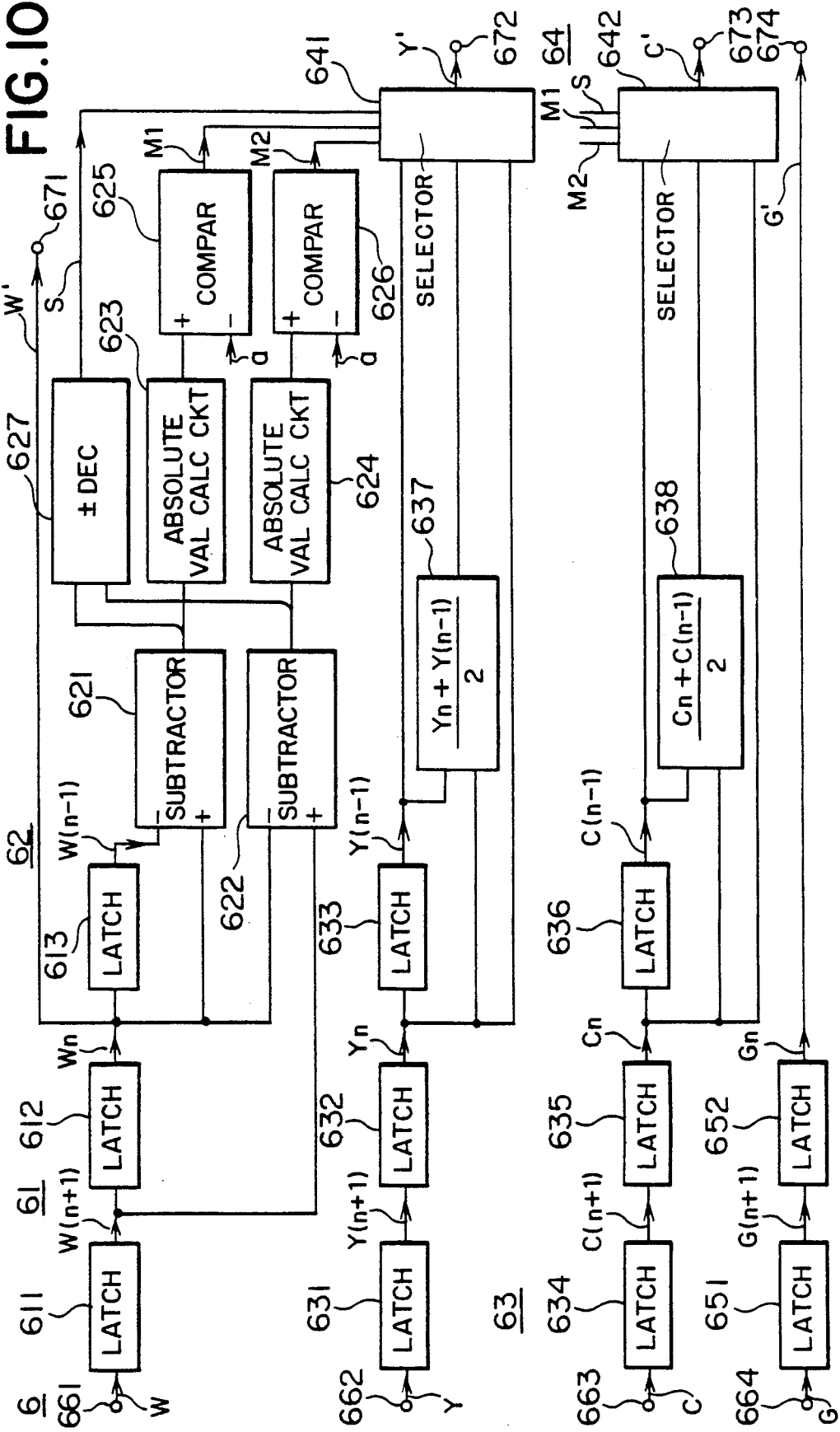
FIG. 10 is a block diagram showing a color signal conversion circuit in the first embodiment of this invention.

Now, the first embodiment of this invention will be described with reference to the drawings. FIG. 10 is a block diagram showing a color signal conversion circuit which is the signal processing portion of a color scanning system according to this embodiment. The color signal conversion circuit generally indicated by numeral 6 constructs color signal conversion means. This color signal conversion circuit 6 is configured of latches 611–613 which constitute brightness signal extraction means 61; subtractors 621, 622, absolute value calculation circuits 623, 624, comparators 625, 626 and a sign decision circuit 627 which constitute detection means 62; latches 631–636 and interpolation circuits 637, 638 which constitute interpolation means 63; selectors 641, 642 which constitute selection means 64; and latches 651, 652 which temporarily hold green (G) signals to delay them. Besides, an input terminal 661 is supplied with a signal W obtained by the A/D (analog-to-digital) conversion of a signal from a detector 431 having no color filter as shown in FIG. 3, and input terminals 662, 663 and 664 are respectively supplied with signals Y, C and G similarly obtained by the A/D conversions of signals from detectors 432, 434 and 433 whose front surfaces are formed with color filters of yellow (Y), cyan (C) and green (G). These signals W, Y, C and G are respectively received in synchronism with unshown reference clock pulses sequentially from the output of the first detector 431. In addition, output terminals 671, 672, 673 and 674 deliver processed color signals W', Y', C' and G', respectively.

The first embodiment is constructed as stated above, and the operation thereof will now be described in detail by referring also to FIG. 11 which is an explanatory diagram showing the operations of the selectors 641, 642 of the color signal conversion circuit 6.

In this embodiment, the signal W from the detector 431 formed with no color filter is regarded as a brightness signal. The signals W of the (n−1)-th, n-th and (n+1)-th picture elements applied to the input terminal 661 become signals W(n−1), Wn and W(n+1) existing at the same point of time, through the latches 611–613. These signals W(n−1), Wn and W(n+1) are input to the subtractors 621 and 622. The subtractors 621 and 622 subtract the input signals, and the former 621 delivers a subtracted signal Wn−W(n−1), while the latter 622 delivers a subtracted signal W(n+1)−Wn. The sign decision circuit 627 operates as an exclusive- OR circuit, and it takes out only the most significant bits of the received subtracted signals Wn−W(n−1) and W(n+1)−Wn and calculates (W(n+1)−Wn)×(Wn−W(n−1)) so as to deliver the sign of the calculated result as a signal S. This signal S indicates whether the brightness signal W of a read image is monotonically increasing or monotonically decreasing in the vicinity of the n-th picture element, or whether or not it has an extreme value. In FIG. 11, the signs of the signal S are denoted by + and −. On the other hand, the subtracted signals (W(n−1)−Wn) and (Wn−W(n+1)) which are the outputs from the corresponding subtractors 621 and 622 are respectively turned into absolute value signals |W(n+1)−Wn| and |Wn−W(n+1)| through the absolute value calculation circuits 623 and 624. These absolute value signals are respectively compared with a predetermined value a by the comparators 625 and 626, the respective output signals M1 and M2 of which are delivered to both the selectors 641 and 642.

Meanwhile, the signals Y of the (n−1)-th, n-th and (n+1)-th picture elements applied from the detector 432 to the input terminal 662 are turned into signals Y(n−1), Yn and Y(n+1) at the same point of time through the latches 631–633. Owing to the interpolation circuit 637, an interpolated signal Yn, (n−1) corresponding to (Yn+Y(n−1))/2 is obtained and is delivered to the selector 641. This selector 641 selects one of its input signals Y(n−1), (Yn+Y(n−1))/2 and Yn in accordance with the aforementioned signals S, M1 and M2 as illustrated in FIG. 11, and it delivers the selected signal as the output signal Y′ from the output terminal 672.

Further, the signals C applied to the input terminal 663 are processed quite similarly to the signals Y stated above. The selector 642 selects one of its input signals C(n−1), (Cn+C(n−1))/2 and Cn in accordance with the signals S, M1 and M2 as illustrated in FIG. 11, and it delivers the selected signal as the output signal C′ from the output terminal 673.

In addition, regarding the signal W received at the input terminal 661 and the signal G received at the input terminal 664, the n-th signals are respectively delivered as the output signals W′ and G′ from the output terminals 671 and 674 as they are.

How noise at the contour part of the read image can be relieved by the color signal conversion circuit 6, will be described in detail below.

First, there will be elucidated a case where the contour part of the read image is very acute. Assuming that, as shown in FIG. 3, the contour part of the read image lies at a position corresponding to the interstice between the detector of the (n−1)-th picture element and the detector 431 of the n-th picture element having no color filter, the position is considered to overlie that detector of the (n−1)-th picture element whose surface is formed with the yellow color filter Y(n−1). In this case, the read image does not change greatly between the positions Wn and W(n+1). Accordingly, even when the color signals for the n-th picture element are set at the signals Wn, Yn, Gn and Cn, the noise of the contour part does not develop. At this time, the inputs of the comparators 625 and 626 satisfy the following relations:

$$|Wn - W(n-1)| > a \qquad (3)$$

$$|W(n+1) - Wn| < a \qquad (4)$$

Therefore, the signal M1 becomes greater, and the signal M2 becomes smaller, with the result that the signals Yn and Cn are delivered as the respective output signals Y′ and C′ in view of the table of FIG. 11.

Assuming that the contour part of the read image lies at a position corresponding to the interstice between the n-th picture element and the detector of the (n+1)-th picture element having no color filter, the position is considered to overlie that detector of the n-th picture element whose surface is formed with the yellow color filter Yn. On this occasion, the read image does not change greatly between the positions W(n−1) and Wn. Therefore, when the color signals for the n-th picture element are set at the signals Wn, Y(n−1), Gn and C(n−1), the noise of the contour part does not develop. In this case, the inputs of the comparators 625 and 626 satisfy the following relations:

$$|Wn - W(n-1)| < a \qquad (5)$$

$$|W(n+1) - Wn| > a \qquad (6)$$

Therefore, the signal M1 becomes smaller, and the signal M2 becomes greater, with the result that the signals Y(n−1) and C(n−1) are respectively delivered as the output signals Y′ and C′ in view of the table of FIG. 11.

Next, there will be elucidated a case where the contour part of the read image is smooth. In this case, the color signals do not change greatly among the (n−1)-th, n-th and (n+1)-th picture elements, and the following relations hold:

$$|Wn - W(n-1)| < a \qquad (7)$$

$$|W(n+1) - Wn| < a \qquad (8)$$

Figure 1:
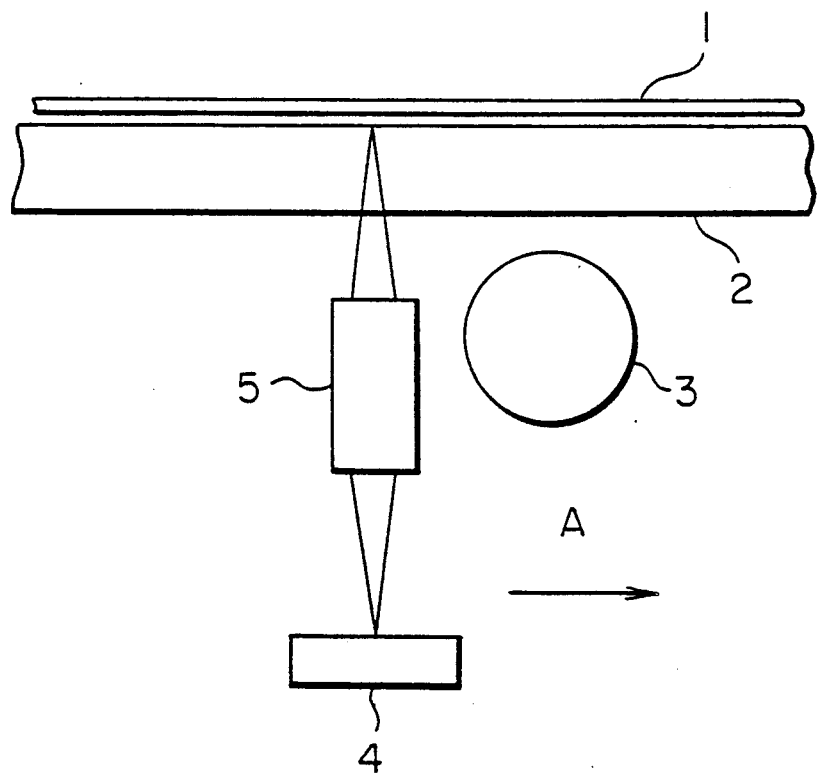
FIG. 1 is a side view schematically showing a conventional color scanner for explaining a prior-art example.

Accordingly, both the signals M1 and M2 become smaller. Thus, even when the color signals for the n-th picture elements are set at Wn, Yn, Gn and Cn, the noise of the contour part does not develop. When the contour part of the read image fulfills the following relations:

$$|Wn - W(n-1)| > a \qquad (9)$$

$$|W(n+1) - Wn| > a \qquad (10)$$

it is considered that the image changes comparatively greatly in the areas W(n−1), Y(n−1), Wn, Yn and W(n+1). Accordingly, whether the color signals for the n-th picture element are set at the signals Wn, Yn, Gn and Cn or at the signals Wn, Y(n−1), Gn and C(n−1), a color which is not contained in the original (1 in FIG. 1) appears. Therefore, as indicated by the case of FIG. 11 where the signal S is +, the signal M1 is greater and the signal M2 is greater, the color signals of the n-th picture element are set at Wn, (Yn+Y(n−1))/2, Gn and (Cn+C(n−1))/2, and the output signals Y' and C' of the positions Yn and Cn are predicted by the interpolations and are used as the values of the n-th picture element. Then, the noise of the contour part can be reduced.

Besides, although the signal S is usually "+", it can become "−" in a case where the image hardly changes and where the signs of the difference signals (W(n+1)−Wn) and (Wn−W(n−1)) differ due to noise, and a case where the image is extraordinarily fine. The former case may be handled quite similarly to the case where the signal S is "+". The latter case is a case where the read limits of the scanner of the pertinent type are exceeded, so that the signals Wn, Yn, Gn and Cn are used as the output signals of the n-th picture element. Since, on this occasion, the change of one picture element is concerned, the quality of the read image hardly changes in itself.

Incidentally, the foregoing embodiment has exemplified the case where one picture element is composed of the detectors whose surfaces are formed with the four kinds of color filters. However, the combination of the color filters is not restricted thereto, but the same effects as in the embodiment are achieved even with color filters of red, green, blue, etc.

In addition, although the output signal from the detector having no color filter has been employed as the brightness signal in the foregoing embodiment, any of signals (Wn+Gn), (Yn+Cn), Gn, etc. may well be employed, and the same effects as in the embodiment are achieved.

The second embodiment of this invention to be described below consists in comprising interpolation means for imaginarily setting sampling points between a plurality of detectors and for finding individual color signals at the sampling points by interpolations from the output signals of the detectors near them.

Figure 12:
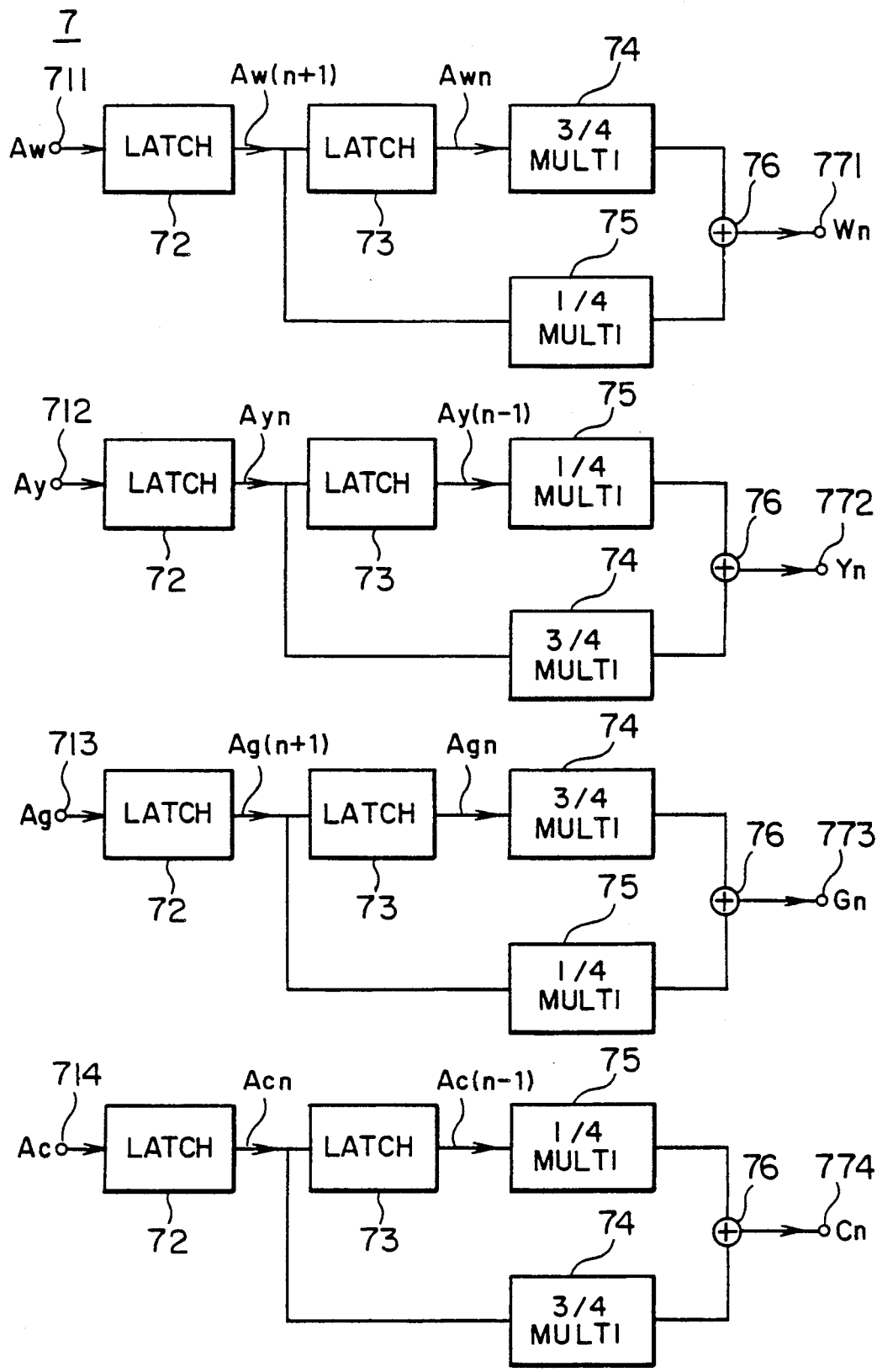
FIG. 12 is a block diagram showing interpolation means in the second embodiment of this invention.

FIG. 12 is a block diagram showing the interpolation means 7 for interpolatingly processing the output signals of the detectors. Referring to the figure, the input terminals 711–714 of the interpolation means 7 are respectively supplied with digital signals Aw, Ay, Ag and Ac obtained by the A/D conversions of the output signals from the detectors 431–434 (in FIG. 3). For each of the individual channels of the digital signals Aw, Ay, Ag and Ac, the interpolation means 7 comprises in equivalent fashion, latches 72, 73 in each of which the corresponding signal is once held, a $\frac{3}{4}$ multiplier 74 which multiplies the signal by $\frac{3}{4}$, a $\frac{1}{4}$ multiplier 75 which multiplies the signal by $\frac{1}{4}$, and an adder 76. Output signals Wn, Yn, Gn and Cn in white (W), yellow (Y), green (G) and cyan (C) are respectively derived from the output terminals 771, 772, 773 and 774 of the interpolation means 7.

Figure 2:
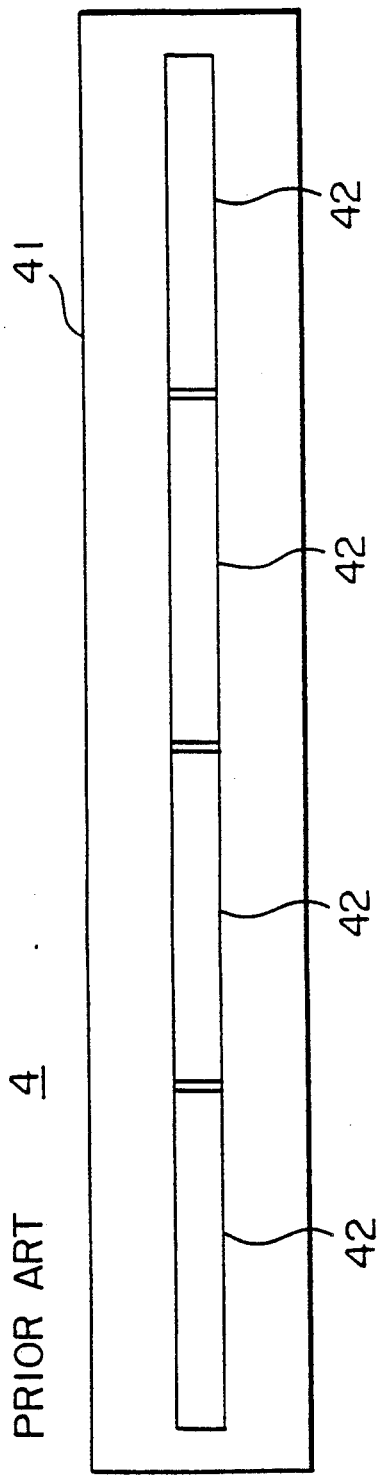
FIG. 2 is a plan view showing an image sensor for use in the color scanner in FIG. 1.
Figure 13:
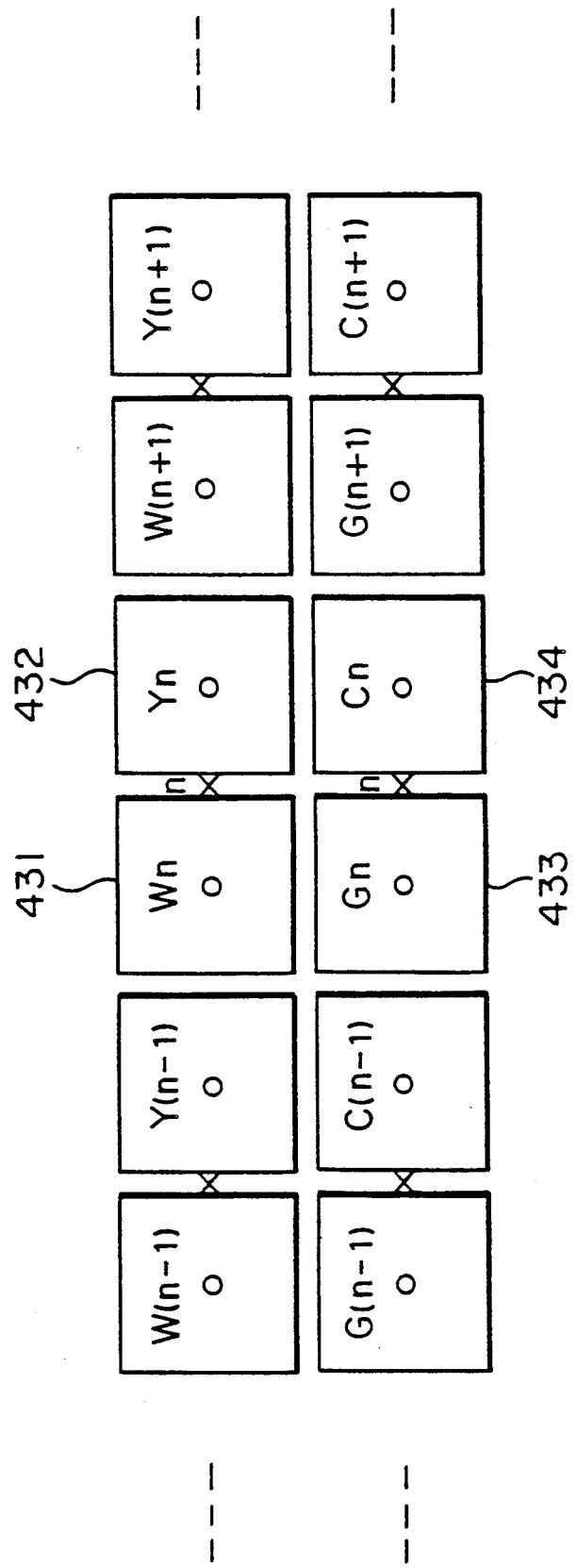
FIG. 13 is an enlarged plan view showing the layout of the detectors of an image sensor for use in the embodiment in FIG. 12.

FIG. 13 is a plan view showing the layout of color filters on an image sensor 4 (in FIG. 1) likewise to FIG. 3. The detectors 431–434 in FIG. 13 are disposed on the CCD image sensor 42 (in FIG. 2). The detector 431 has no color filter, whereas the other detectors 432–434 are respectively formed with the color filters of yellow, green and cyan at the front surfaces thereof. In FIG. 13, marks o indicate the centers of the respective detectors 431–434, and marks x indicate the imagninary sampling points.

The second embodiment is constructed as stated above, and the operation thereof will be described in detail below. As clarified from the explanation of the prior-art example, the cause of the noise at the boundary part of an image lies in the fact that the detectors shown in FIG. 13, for example, those 431–434, which read the respective color components perform the photoelectric conversions of image information items at the different positions of the original (1 in FIG. 1). Accordingly, the sampling points are imaginarily set between detectors as indicated by the marks x in FIG. 13, and the signal outputs of the respective color components at these sampling points are found by the interpolations of the output signals from the detectors nearby, whereby the output signals of the image sensor 4 can be given as if the detectors for the respective color components lay at the imaginary sampling points at all times.

By way of example, when the imaginary sampling point n is set at the middle between the detector 431 of area Wn and the detector 432 of area Yn as shown in FIG. 13, the signals Wn and Yn at the imaginary sampling point n can be respectively evaluated by the following equations (11) and (12):

$$Wn = \frac{3 Awn + Aw(n + 1)}{4} \quad (11)$$

$$Yn = \frac{Ay(n - 1) + 3 Ayn}{4} \quad (12)$$

Likewise, the signals Gn and Cn at the imaginary sampling point n at the middle between areas Gn and Cn can be found by the following calculations:

$$Gn = \frac{3 Agn + Ag(n + 1)}{4} \quad (13)$$

$$Cn = \frac{Ac(n - 1) + 3 Acn}{4} \quad (14)$$

Here, the aforementioned equations (11)–(14) are realized by the interpolation means 7 of the embodiment shown in FIG. 12. More specifically, regarding the output signal Aw from the detector 431 in FIG. 3, the signal Awn of the n-th picture element and the signal Aw(n+1) of the (n+1)-th picture element are obtained at the same point of time by the latches 72 and 73. Subsequently, the signal Awn is input to the $\frac{3}{4}$ multiplier 74, while the signal Aw(n+1) is input to the $\frac{1}{4}$ multiplier 75. The processed results of these multipliers are added by the adder 76, whereby the output signal Wn is obtained at the output terminal 771. Likewise, the output signals Yn, Gn and Cn can be respectively obtained for the input signals Ay, Ag and Ac. Color signals Rn, Gn and Bn produced by subjecting the output signals Wn, Yn, Gn and Cn to the transformations of the following equation afford color image signals free from the noise at the boundary part of the image:

$$\begin{pmatrix} Rn \\ Gn \\ Bn \end{pmatrix} = \begin{pmatrix} M_{11} & M_{12} & M_{13} & M_{14} \\ M_{21} & M_{22} & M_{23} & M_{24} \\ M_{31} & M_{32} & M_{33} & M_{34} \end{pmatrix} \begin{pmatrix} Wn \\ Yn \\ Gn \\ Cn \end{pmatrix} \quad (15)$$

Although the foregoing embodiment has been described as to the case of employing the color filters of the colors W, Y, G and C and arraying the detectors in two rows, the colors and layout of the color filters may well be any others. By way of example, color filters of colors R, G and B may well be arrayed in one row, and the same effects as in the embodiment are achieved.

The third embodiment of this invention to be described below consists in comprising comparison means for comparing for a particular picture element, the brightness signals of a plurality of picture elements near the particular element, and selection means for selecting M detectors constitutive of the particular picture element and deciding the colors of the particular picture element on the basis of a signal from the comparison means.

Figure 14:
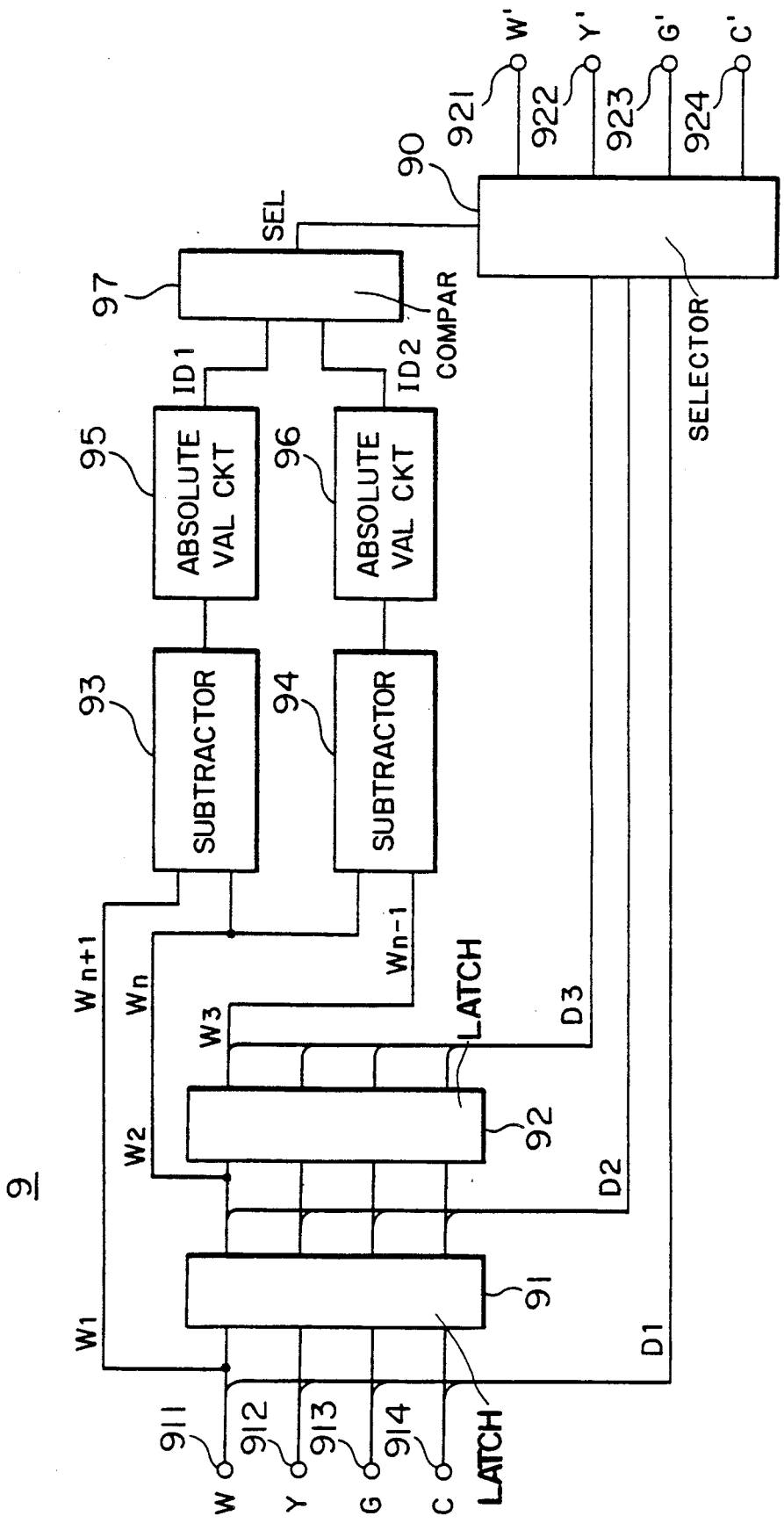
FIG. 14 is a block diagram showing a signal processing portion in the third embodiment of this invention.

FIG. 14 is a block diagram showing a signal processing portion in this embodiment. The signal processing portion is configured of at least two latches 91, 92, two subtractors 93, 94 and two absolute value circuits 95, 96, and one comparator 97 which constitute comparison means 9; and one selector 90 which constitutes selection means. Numerals 911, 912, 913 and 914 designate input terminals for detected color picture information, which correspond respectively to white (W), yellow (Y), green (G) and cyan (C). In addition, numerals 921, 922, 923 and 924 designate output terminals which correspond respectively to the input terminals 911, 912, 913 and 914. The input terminals 911, 912, 913 and 914 are respectively connected to the corresponding input terminals of the latch 91, and they are collectively connected to one input terminal of the selector 90. In the latter case, the input terminal of the selector 90 is supplied with a signal D1 from all of the input terminals 911–914. Besides, a signal W1 is applied from the input terminal 911 to one input terminal of the subtractor 93. Similarly, the output terminals of the latch 91 are respectively connected to the input terminals of the latch 92, and they are collectively connected to another input terminal of the selector 90 so as to apply a signal D2 thereto. Further, the output terminal of the latch 91 corresponding to white (W) is connected to the other input terminal of the subtractor 93 and one input terminal of the subtractor 94 so as to apply a signal W2 thereto. The output terminals of the latch 92 are all connected to still another input terminal of the selector 90 so as to apply a signal D3 thereto, and the output terminal thereof corresponding to white (W) is connected to the other input terminal of the subtractor 94 so as to apply a signal W3 thereto. The output terminals of the subtractors 93 and 94 are respectively connected to the absolute value circuits 95 and 96, the output terminals of which are respectively connected to the input terminals of the comparator 97. The output terminal of the comparator 97 is connected to the selector 90. The absolute value circuits 95 and 96 apply signals ID1 and ID2 to the comparator 97, respectively, and the comparator 97 applies a signal SEL to the selector 90.

This embodiment is constructed as stated above, and the operation thereof will now be described in detail with reference to a timing chart in FIG. 15 and a layout plan in FIG. 16 showing detectors constitutive of picture elements. Signals W, Y, G and C from the image sensor 4 shown in FIG. 2 etc. are respectively applied to the input terminals 911, 912, 913 and 914 shown in FIG. 14. As illustrated at W1 in FIG. 15, the signals W1 of the input terminal 911 are given as Wn-1, Wn, Wn+1, Wn+2, Wn+3 ... with the lapse of time. Here, letter n denotes the n-th picture element 43 as shown in FIG. 16. The signal W1 is changed into the signal W2 as shown in FIG. 15 by passing it through the latch 91, and the signal W2 is changed into the signal W3 as shown in FIG. 15 by passing it through the latch 92. More specifically, letting Wn+1 denote the white signal W1 applied to the input terminal 911 at a point of time tn, the signal W2 becomes Wn and the signal W3 becomes Wn−1 as indicated in FIG. 15. These signals are input to the subtractors 93 and 94, the outputs of which are respectively given as Wn−Wn+1 and Wn−Wn−1. These outputs are further input to the absolute value circuits 95 and 96, the outputs ID1 and ID2 of which become ID1=|Wn−Wn+1| and ID2=|Wn−Wn−1| as indicated in FIG. 15. The absolute value signals are further input to the comparator 97 so as to compare the magnitudes thereof, whereupon a signal Sn is obtained as the select signal SEL. The signal Sn in this case is determined by the following conditions:

$$|Wn - Wn-1| < |Wn - Wn+1| \quad (16)$$

$$|Wn - Wn-1| = |Wn - Wn+1| \quad (17)$$

$$|Wn - Wn-1| > |Wn - Wn+1| \quad (18)$$

The select signal SEL produced according to these conditions is sent to the selector 90, and is used for controlling the selecting operation thereof. Meanwhile, the collective signal of the signals W, Y, G and C applied from the image sensor 4 to the respective input terminals 911, 912, 913 and 914 become the signal D1 immediately after having been applied, the signal D2 after having passed through the latch 91, and the signal D3 after having passed through the latch 92, and these signals D1–D3 are respectively input to the selector 90. The signals D1, D2 and D3 change as indicated in FIG. 15 with the lapse of time. At the point of time tn, they become D1=Dn+1, D2=Dn and D3=Dn−1 (where Dn denotes the combined output of white (W), yellow (Y), green (G) and cyan (C) of the n-th picture element). According to the aforementioned conditions of the select signal SEL and in response to the input signals D1, D2 and D3, the selector 90 delivers the following outputs Wn', Yn', Gn' and Cn':

$$Wn'=Wn, Yn'=Yn-1, Gn'=Gn, Cn'=Cn-1 \text{ for}$$
$$|Wn-Wn-1| < |Wn-Wn+1| \quad (16);$$

$$Wn'=Wn, Yn'=Yn, Gn'=Gn, Cn'=Cn \text{ for}$$
$$|Wn-Wn-1| = |Wn-Wn+1| \quad (17);$$

and $$Wn'=Wn+1, Yn'=Yn, Gn'=Gn+1, Cn'=Cn \text{ for}$$
$$|Wn-Wn-1| > Wn-Wn+1| \quad (18).$$

The above results become as shown in FIG. 16 in terms of the combinations of the detectors on the image sensor 4. In the figure, a part (I) corresponds to the case of |Wn−Wn−1|<Wn−Wn+1|. In this case, the combination 98 of the n-th picture element is shifted in the direction of decreasing the number n in an amount of one column of the detectors relative to the n-th picture element 43 constituting the sensor 4 as shown in FIG. 3. A part (II) corresponds to the case of |Wn−Wn−1|=|Wn−Wn+1|. In this case, the combination 99 of the n-th picture element agrees with the n-th picture element 43 in the sensor construction. A part (III) corresponds to the case of |Wn−Wn−1|>|Wn−Wn+1|. In this case, the combination 100 of the n-th picture element is shifted in the plus direction in an amount of one column of the detectors relative to the n-th picture element 43 in the sensor construction. In a case where the boundary of colors lies substantially centrally of the picture element 43, $|Wn-Wn-1|<|Wn-Wn+1|$ holds, and the picture element at this time is composed of the filter elements (Wn, Yn−1, Gn, Cn−1). Thus, the noise of the color boundary can be almost eliminated.

In the third embodiment, the latches 91 and 92 have been employed. Since, however, they serve to delay the image signals, the same effects as in the embodiment are achieved even when sample-and-hold circuits or an analog shift register such as CCD or BBD are/is used instead.

The fourth embodiment of this invention to be described below consists in that charges stored in individual detectors are kept stored in storage means till a predetermined time, whereby the output start times of the stored charges can be set at the same point of time.

Figure 17:
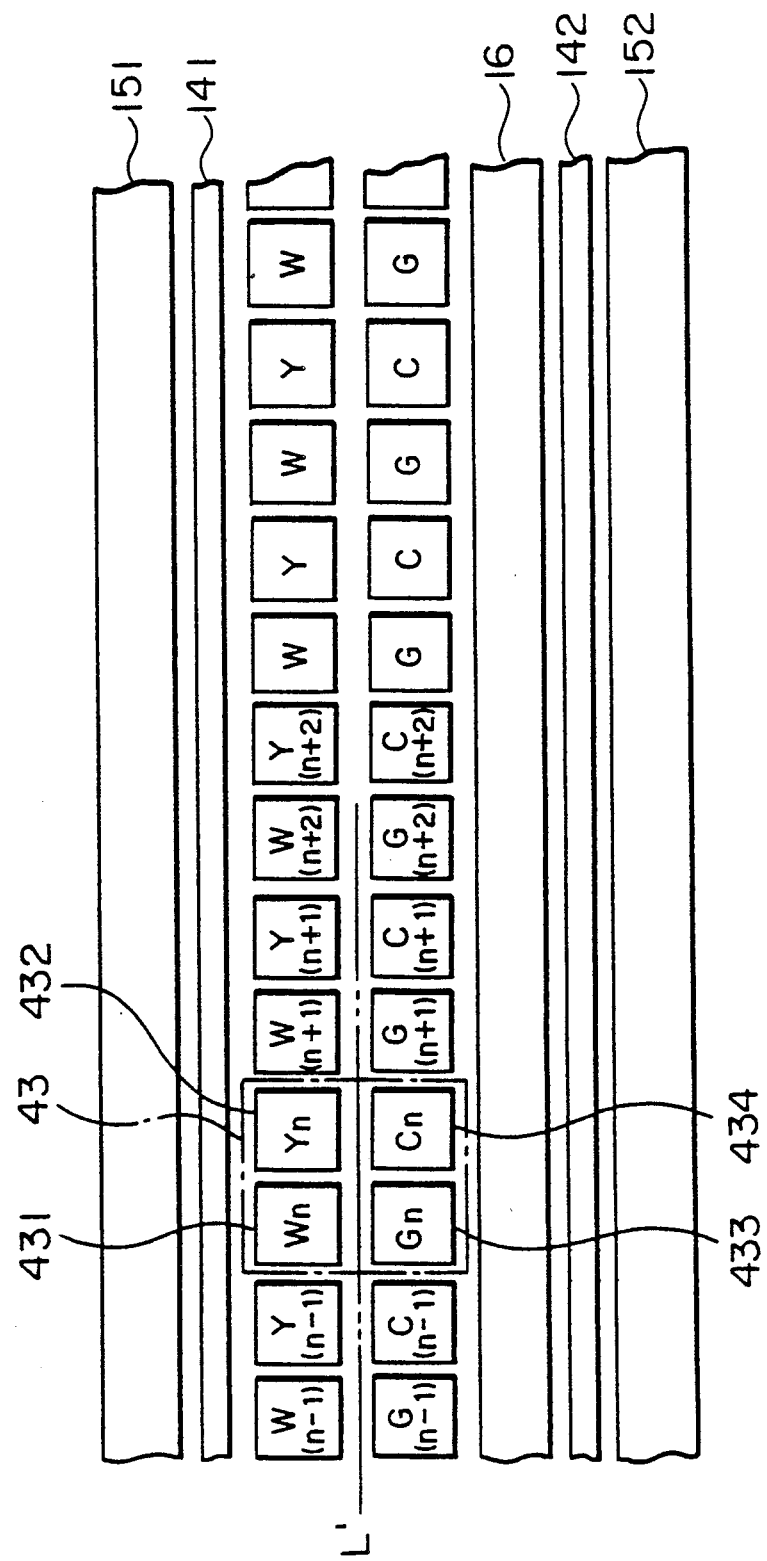
FIG. 17 is an enlarged plan view of the detector area of an image sensor in the fourth embodiment of this invention.

FIG. 17 shows the construction of the essential portions of this embodiment.

Numeral 141 designates a transfer gate for transferring charges generated in detectors 431 and 432 by incident light, to a CCD channel 151. Numeral 16 designates a line shift gate (second storage means) for accepting or temporarily storing charges generated in detectors 433 and 434 by incident light.

Shown at numeral 142 is a transfer gate for transferring the charges temporarily stored in the line shift gate 16, to a CCD channel 152.

Figure 18:
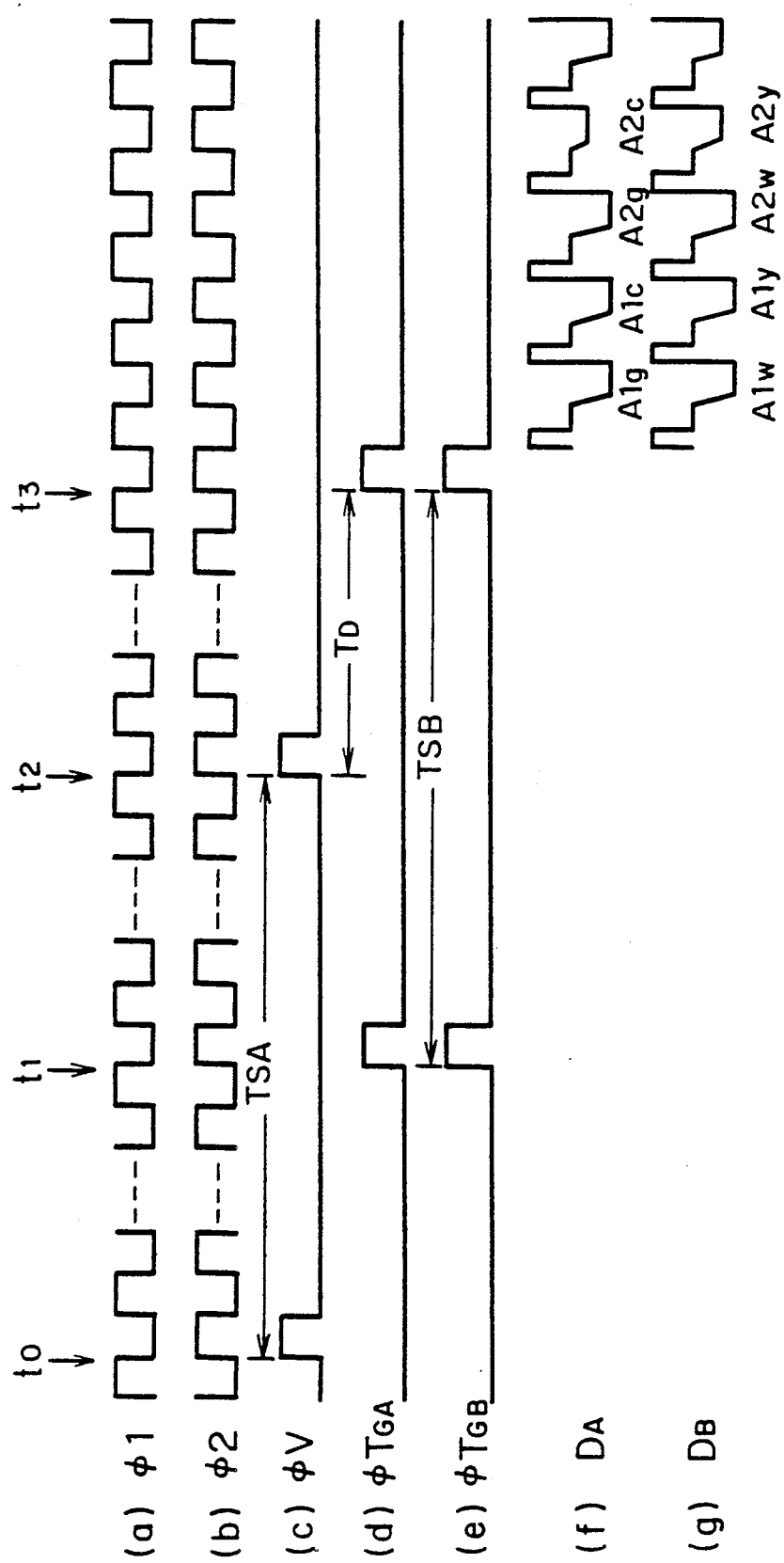
FIG. 18 is a timing chart showing a method of driving the image sensor shown in FIG. 17.

FIG. 18 is a timing chart showing the setting of the storage time of each row in the detector array of two rows as depicted in FIG. 17.

Now, the operation of this embodiment will be described. Symbols $\phi 1$ and $\phi 2$ at (a) and (b) in FIG. 18 denote two-phase clock pulses which are impressed on the CCD channels 151 and 152 in FIG. 17, respectively, and these clock pulses are applied continuously at all times. Symbol $\phi V$ at (c) in FIG. 18 denotes pulses which are impressed on the line shift gate 16 in FIG. 17. This line shift gate 16 has potential wells for temporarily storing the stored charges of the respective detectors 431, 432, 433 and 434. More specifically, when the line shift pulse $\phi V$ is at a high voltage (high level), the charges of the detectors 433 and 434 are transferred into the line shift gate 16. On the other hand, when the line shift pulse $\phi V$ is at a low voltage (low level), the transferred charges are temporarily stored in the line shift gate 16.

Symbols $\phi T_{GA}$ and $\phi T_{GB}$ at (d) and (e) in FIG. 18 denote transfer gate pulses which are impressed on the transfer gates 142 and 141, respectively. When the lower part and upper part of the detector array with respect to a center line L' indicated in FIG. 17 are termed channel-A and channel-B, the storage times TSA and TSB of the channels correspond to the periods of the pulses $\phi V$ and $\phi T_{GB}$ in FIG. 18, respectively.

Next, there will be described how to move the stored charges of the respective channels shown in FIG. 17. The detectors 433 and 434 of the channel-A in FIG. 17 store the charges generated by the incident light, during the interval (interval TSA) from the high level (at a point of time $t_0$) to the next high level (at a point of time $t_2$) of the pulse $\phi V$ shown at (c) in FIG. 18. The stored charges enter the potential wells within the line shift gate 16 in FIG. 17 at the point of time $t_2$ so as to be stored therein. Thereafter, when the pulse $\phi T_{GA}$ at (d) in FIG. 18 as impressed on the transfer gate 142 in FIG. 17 becomes its high level (at a point of time $t_3$), the charges stored in the line shift gate 16 are transferred to the CCD channel 152 in FIG. 17, and the transferred charges are successively delivered as outputs since the point of time $t_3$.

On the other hand, the detectors 431 and 432 of the channel-B in FIG. 17 store the charges generated by the incident light, during the interval (interval TSB) from the high level (at a point of time $t_1$) to the next high level (at the point of time $t_3$) of the pulse $\phi T_{GB}$ shown at (e) in FIG. 18. The stored charges are transferred to the CCD channel 151 through the transfer gate 141 in FIG. 17 at the point of time $t_3$, and the transferred charges are successively delivered as outputs since the point of time $t_3$.

Figure 19:
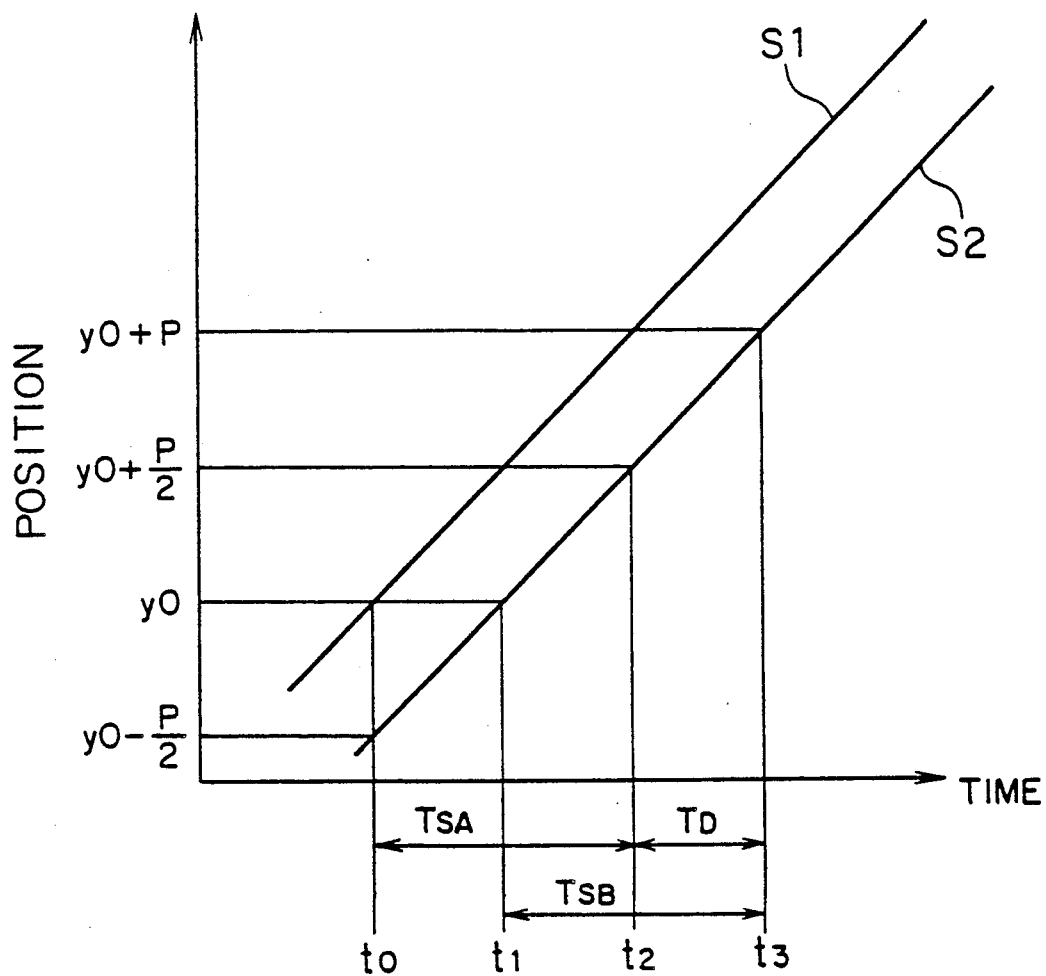
FIG. 19 is an explanatory diagram showing the positional relationships between the image sensor and an original in the fourth embodiment.

Next, there will be described the operation of this embodiment at a color boundary part. FIG. 19 show those positions (in the direction of vertical line scan) of an original (1 in FIG. 1) at which the detectors of the channel-A and channel-B in the color scanner exist with the lapse of time. Letter P denotes the pitch of the vertical line scan. It is assumed that, at a point of time $t_0$ indicated in FIG. 19, the detectors 433 and 434 of the channel-A lie at a position y0, while the detectors 431 and 432 of the channel-B lie at a position y0−(P/2). In the color scanner, the detectors 431–434 are moved relative to the original 1. Symbol S1 in FIG. 19 denotes the moved states of the detectors 433 and 434 of the channel-A, and symbol S2 the moved states of the detectors 431 and 432 of the channel-B.

Points of time $t_0$, $t_1$, $t_2$ and $t_3$ in FIG. 19 correspond to the points of time indicated by the same symbols in FIG. 18, respectively.

In this embodiment, the start times of the storage times TSA and TSB of the respective channels-A and B are the same as in the prior-art example stated before. That is, the start time $t_1$ of the storage time of the channel-B is set at $t_0+(TSA/2)$. Thus, noise to develop at the color boundary part is eliminated as in the prior-art example.

This embodiment is further contrived so that the charges stored in the channel-A during the interval TSA may begin to be temporarily stored in the line shift gate 16 in FIG. 17 at the end point of time $t_2$ of the storage time TSA and may begin to be output at the point of time $t_3$ in FIG. 19. This point of time $t_3$ is identical to the output start time of the charges stored in the channel-B That is, the charges stored in both the channels-A and B during the respective storage times TSA and TSB are output at the same point of time.

As thus far described, according to this embodiment, the buffer memory circuits having hitherto been required for reducing the noise of the color boundary part are dispensed with, so that the color scanner of simple circuit arrangement and low cost can be provided.

Although the foregoing embodiment has indicated the case where the storage times TSA and TSB of the respective channels are equal, they may well be unequal time intervals In addition, although the embodiment has indicated the case where the detectors 431–434 are linearly moved relative to the original 1, the moving method is not restricted thereto.

What is claimed is:

1. A color scanning system comprising:
    illumination means for illuminating an original,
    a plurality of picture elements disposed in an array, each picture element including a plurality of detectors by which a color image formed by illuminating the original is converted into electric signals, the signals of one of the plurality of detectors of each picture element to be employed as brightness signals, focusing means for focusing the color image on said detectors, a plurality of color filters which discriminate respective color components of the focused color image and which are disposed on respective detectors of said plurality of detectors for each picture element, and color signal conversion means including brightness signal extraction means for deriving the brightness signals detected by detectors of $(n-1)$-th, n-th, and $n+1$-th picture elements, where n denotes a plus integer, the corresponding brightness signals existing at an identical time, detection means for detecting differences between the $(n+1)$-th and n-th derived brightness signals and between the nth and $(n-1)$-th derived brightness signals, interpolation means for interpolating color signals of respective color components detected by respective detectors of the n-th picture element and one of the $(n-1)$-th and the $(n+1)$-th picture element to find a color signal, and selection means for delivering one of the n-th color signal, the $(n-1)$-th color signal, the $(n+1)$-th color signal, and the interpolated signal produced by said interpolation means as an n-th color signal output in accordance with the detected difference signals produced by said detection means.

2. A color scanning system comprising:

illumination means for illuminating an original, a plurality of picture elements disposed in an array, each picture element including a plurality of detectors by which a color image formed by illuminating the original is converted into electric signals, focusing means for focusing the color image on said detectors, a plurality of color filters which discriminate respective color components of the focused color image and which are disposed on respective detectors of said plurality of detectors for each picture element, and interpolation means for setting a sampling point for a given one of the plurality of picture elements among the plurality of detectors of the given picture element, the given picture element having a picture element adjacent thereto, and for attributing individual color signals for the respective color components to the sampling point through interpolations between the output signals of the respective detectors of the given picture element and the respective detectors of the adjacent picture element based on distances between the sampling point and the respective detectors of the given picture element and between the sampling point and the respective detectors of the adjacent picture element.

3. A color scanning system comprising:

illumination means for illuminating an original, a plurality of picture elements disposed in an array, each picture element including a plurality of detectors adjacent to one another, M being the number of detectors making up said plurality of detectors of each picture element, by which a color image formed by illuminating the original is scanned and is converted into electric signals, the signals of one of the plurality of detectors of each picture element to be employed as brightness signals, focusing means for focusing the color image on said detectors, N color filters (where N denotes an integer of at least 3 and $M \geq N$) which discrimate respective colors of the focused color image and which are disposed on respective detectors of said plurality of detectors for each picture element, comparison means for comparing, for an n-th picture element of the array having $(n-1)$-th and $(n+1)$-th picture elements of the array adjacent to an don opposite sides of the n-th picture element, the brightness signals of the $(n+1)$-th and $(n-1)$-th picture elements with the brightness signals of the n-th picture element and for producing select signals related to the comparison of the brightness signals, and selection means for selecting color signals detected by the respective detectors of the $(n-1)$-th and $(n+1)$-th picture elements and attributing the selected color signals to the respective detectors of the n-th picture element on the basis of the select signals from said comparison means.

* * * * *

UNITED STATES PATENT AND TRADEMARK OFFICE
CERTIFICATE OF CORRECTION

PATENT NO. : 4,992,860

DATED : February 12, 1991

INVENTOR(S) : Hamaguchi et al.

It is certified that error appears in the above-identified patent and that said Letters Patent is hereby corrected as shown below:

On the title page;

In item [30] Foreign Application Priority Data, change

"Mar. 31, 1988  [JP]  Japan .............63-131382" to
--May 31, 1988  [JP]  Japan .............63-131382--;

"Mar. 31, 1988  [JP]  Japan .............63-131383" to
--May 31, 1988  [JP]  Japan .............63-131383--;

"Mar. 31, 1988  [JP]  Japan .............63-131384" to
--May 31, 1988  [JP]  Japan .............63-131384--.

In item [57] Abstract, line 14, change "on" to --of--.

Column 16, line 32, change "an don" to --and on--.

Signed and Sealed this

Twenty-second Day of September, 1992

Attest:

DOUGLAS B. COMER

*Attesting Officer*    *Acting Commissioner of Patents and Trademarks*